(12) United States Patent
Schirle

(10) Patent No.: US 6,296,275 B1
(45) Date of Patent: Oct. 2, 2001

(54) VEHICULAR SIDE-IMPACT RESTRAINT SYSTEM

(75) Inventor: Anton Schirle, Stimpfach (DE)

(73) Assignee: TRW Occupant Restraint Systems GmbH & Co., KG, Aldorf (DE)

( * ) Notice: Subject to any disclaimer, the term of this patent is extended or adjusted under 35 U.S.C. 154(b) by 0 days.

(21) Appl. No.: 09/368,286

(22) Filed: Aug. 3, 1999

(30) Foreign Application Priority Data

Aug. 4, 1998 (DE) ................................. 298 13 962

(51) Int. Cl.⁷ .................................................. B60R 21/20
(52) U.S. Cl. ..................... 280/743.1; 280/728.2; 280/730.2
(58) Field of Search ...................... 280/730.2, 728.3, 280/728.2, 743.1, 730.1, 728.1

(56) References Cited

U.S. PATENT DOCUMENTS

| | | | |
|---|---|---|---|
| 5,462,308 | * 10/1995 | Seki et al. ........................ | 280/749 |
| 5,791,683 | * 8/1998 | Shibata et al. .................... | 280/730.2 |
| 5,899,486 | * 5/1999 | Ibe ..................................... | 280/728.2 |
| 6,022,044 | * 2/2000 | Cherry ............................... | 280/730.2 |
| 6,102,435 | * 10/1995 | Wallner et al. .................... | 280/730.2 |

FOREIGN PATENT DOCUMENTS 29702008 5/1997 (DE).
29718205 4/1998 (DE).

* cited by examiner

*Primary Examiner*—J. J. Swann
*Assistant Examiner*—David R. Dunn
(74) *Attorney, Agent, or Firm*—Tarolli, Sundheim, Covell, Tummino & Szabo L.L.P.

(57) ABSTRACT

A vehicular side-impact restraint system comprises a gas lance defining a longitudinal direction, a gas bag which is in fluid communication with the gas lance, an ejection channel in which the gas lance and the gas bag are arranged, a cutout provided in the ejection channel and extending transversely to the longitudinal direction, and a cover for the cutout.

1 Claim, 2 Drawing Sheets

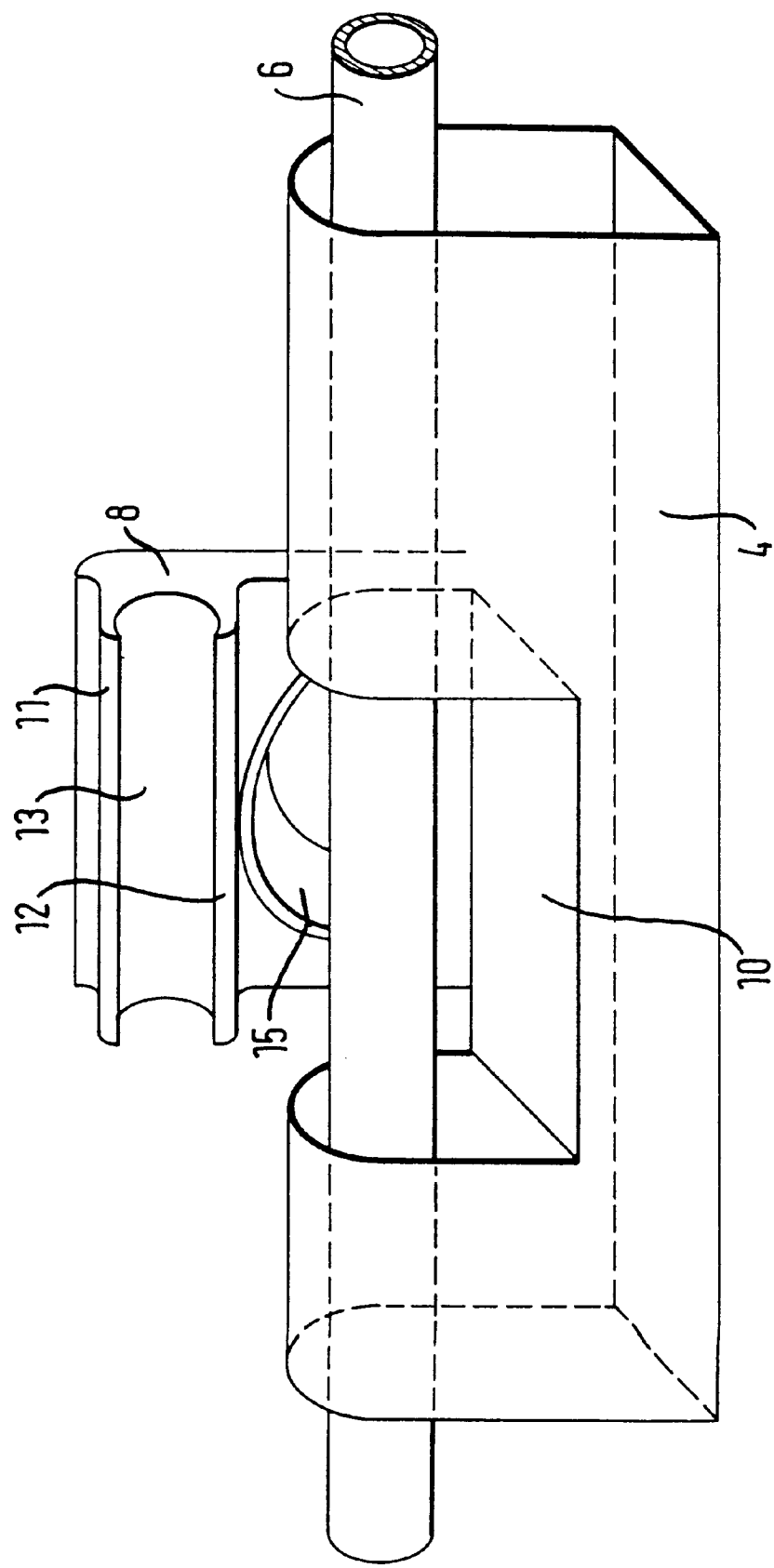

VEHICULAR SIDE-IMPACT RESTRAINT SYSTEM

BACKGROUND OF THE INVENTION

The invention relates to a vehicular side-impact restraint system.

A typical side-impact restraint system comprises a gas lance, a gas bag in fluid communication therewith, and an ejection channel in which the gas lance and the gas bag are arranged.

Such a system is known from prior art. It serves to produce a restraining effect for a vehicle occupant in a side-impact situation so that the risk of injury is reduced or totally eliminated.

BRIEF DESCRIPTION OF THE INVENTION

The invention provides a side-impact restraint system in which various components, for example a luggage net rod, may be attached to the vehicle also in the region of the ejection channel with no problem. For this purpose a vehicular side-impact restraint system is provided which comprises a gas lance defining a longitudinal direction, a gas bag which is in fluid communication with the gas lance, an ejection channel in which the gas lance and the gas bag are arranged, a cutout provided in the ejection channel and extending transversely to the longitudinal direction, and a cover for the cutout.

Advantageous aspects of the invention read from the sub-claims.

BRIEF DESCRIPTION OF THE DRAWINGS

The invention will now be described with reference to a preferred embodiment as shown in the accompanying drawing in which:

FIG. 1 is a schematic cross-sectional view of a side-impact restraint system in accordance with the invention installed in a vehicle and FIG. 2 is a perspective side view of the side-impact restraint system in accordance with the invention as shown in FIG. 1.

DETAILED DESCRIPTION OF THE INVENTION

Figure 1:
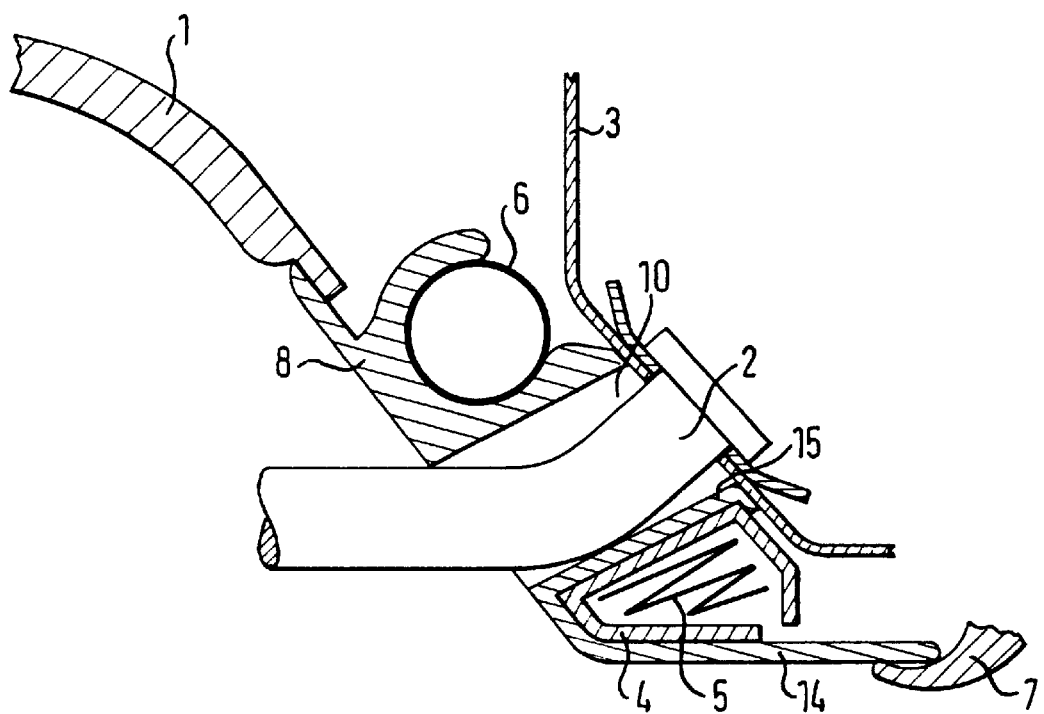

Referring now to FIG. 1 there is illustrated schematically a side-impact restraint system in accordance with the invention which is fitted to a vehicle roof structure 3. Also attached to the vehicle roof structure 3 is a luggage net rod 2.

The side-impact restraint system consists of an ejection channel 4 (see also FIG. 2) in which a gas lance 6 extends, to which a gas bag 5 evident from FIG. 1 is attached such that it may be deployed by the compressed gas introduced therein by the gas lance 6.

The ejection channel 4 is provided with a cutout 10 through which the luggage net rod 2 extends. When the restraint system is installed in the vehicle, this cutout 16 is closed off by means of a cover 8 so that a closed-off surface area is presented to the vehicle interior.

The cover 8 comprises two beads 11, 12 opposite each other in such a way that a groove 13 is formed between them, By means of the two beads 11 and 12 the cover may be clip-mounted on the gas lance 6 so that the gas lance comes to rest in the groove.

The cover 8 is furthermore provided with a lip 14 which clasps the cladding part 7 of the vehicle when the cover 8 is clip-mounted on the gas lance 6. In this way the cover is reliably locked in placed. When the restraint system is activated the lip 14 behind the cladding part is pressed forwards so that the gas bag is able to freely deploy.

Formed furthermore in the cladding part 8 is a guide sleeve 15 surroundingly clasping the luggage net rod 2, this too, contributing towards locking the cover 8 in place, it being desired in addition for a neat visual finish that the cover clasps the luggage net rod 2 as closely as possible.

What is claimed is:

1. A vehicle occupant side impact protection apparatus comprising:

an inflatable gas bag for helping to protect an occupant of a vehicle;

an inflation fluid fill tube defining a longitudinal direction in fluid communication with said gas bag for introducing inflation fluid to said gas bag to inflate said gas bag;

a housing containing said gas bag and said inflation fluid fill tube and for providing a channel into which said gas bag inflates, said housing having a cutout portion separating said inflatable gas bag and said inflation fluid fill tube;

a part which moves upon inflation of said gas bag to provide an opening through which said gas bag inflates, said opening being spaced apart from said cut out, said cut out extending transversely to said longitudinal direction, and a cover for said cutout.

* * * * *